Patented May 13, 1952

2,596,092

UNITED STATES PATENT OFFICE 2,596,092

BIS ALKYLBENZYL ETHERS OF POLY-ETHYLENE GLYCOLS

Peter L. de Benneville, Philadelphia, Pa., assignor to Rohm & Haas Company, Philadelphia, Pa., a corporation of Delaware No Drawing. Application March 28, 1950, Serial No. 152,519

11 Claims. (Cl. 260—611)

This invention relates to non-ionic surface-active compounds and to a process for their preparation. These compounds are characterized by their inertness and stability.

These compounds have the structure

$R^1R^2R^3ArCH_2O(CH_2CH_2O)_nCH_2ArR^1R^2R^3$ wherein $R^1$ is an alkyl group of six to fifteen carbon atoms, $R^2$ and $R^3$ are hydrogen or the methyl group, Ar is the benzene nucleus, and $n$ is a number from 12 to 50 and at least large enough to ensure the water-dispersibility of the said compounds.

These compounds are prepared by reacting together about one mole of a polyethylene glycol having at least twelve ethylene groups and at least two moles of an alkylbenzyl halide in which the alkyl group has six to fifteen carbon atoms in the presence of about two moles of an alkali metal hydroxide. The compounds are capillary active and impart wetting, deterging, and dispersing actions to their solutions. These compounds differ from previously known non-ionic surface-active materials in being free of any reactive terminal group. While containing phenyl groups, they are linked to the polyether chain through a methylene group which apparently gives them a high degree of stability. This type of structure permits use of starting materials which have not heretofore been known to yield non-ionic surface-active agents and allows a considerable latitude of choice of such materials.

Polyethylene glycols are well known. They can be prepared from ethylene oxide over a wide range of molecular sizes. While it may happen that a polyethylene glycol preparation which has an apparent molecular weight of 550, 600, 800, 1200, 1500, or the like may in fact be a mixture of glycols, this does not detract from their usefulness in giving bis alkylbenzyl ethers of value.

The alkylbenzyl halides are readily prepared through alkylating benzene, toluene, or a xylene and halomethylating the resulting alkylbenzene. As alkylbenzene there may be used such hydrocarbons as hexylbenzenes, heptylbenzenes, octylbenzenes, nonylbenzenes, decylbenzenes, undecanylbenzenes, and dodecylbenzenes, or the corresponding alkyltoluenes or alkylxylenes. Typical alkylated compounds are hexylbenzene, (2-hexyl)toluene, (1-methylhexyl)benzene, (1-ethylpentyl)benzene, p-(1-methylhexyl)toluene, (1-methylhexyl)toluene, (1-methylheptyl)benzene, (1-methylheptyl)toluene, (1-methylheptyl)xylene, n-octylbenzene, tert.-octylbenzene, tert.-octyltoluene, tert.-octylxylene, (1,2,4,4-tetramethylpentyl)benzene, (1,3,5-trimethylhexyl)benzene, decylbenzene, (1-methylnonyl)toluene, (1,3,5,7-tetramethyloctyl)benzene or toluene or xylene, etc. The relative positions of the alkyl group to methyl groups in the xylene or toluene is unimportant. The alkyl group may be straight or branched, primary, secondary, or tertiary. Alkyl groups may be supplied from olefine, alcohol, alkyl halide, or acyl group by methods known to the art. Alkylbenzenes used may be single entities or mixtures, resulting from the production of isomers or from use of mixtures in the alkylating reagent.

It is now necessary to halomethylate the alkylphenyl hydrocarbon. A —$CH_2Cl$ or a —$CH_2Br$ group is introduced by reacting the hydrocarbon with formaldehyde and hydrogen chloride or hydrogen bromide in the presence of a catalyst formed from zinc chloride and a lower monocarboxylic acid, which permits halomethylation under mild conditions such that fairly complete monohalomethylation is accomplished without production of resins. While the bromomethyl group is satisfactorily introduced and it gives the same reaction as the chloromethyl group, the latter is economically advantageous.

When a benzene hydrocarbon has an alkyl substituent as large as hexyl, conditions of halomethylation must be adopted which will ensure monohalomethylation approaching completion. The difficulty of doing so increases somewhat with the increasing size of alkyl group present. With groups of six to eight carbon atoms a fair extent of halomethylation is obtained by the use of zinc chloride as a catalyst. Yet a considerable proportion of hydrocarbon remains in the reaction mixture. The addition of a lower aliphatic monocarboxylic acid, such as formic, acetic, chloroacetic, or propionic, brings about a remarkable improvement in the action of the zinc chloride. Acid anhydride can be used in place of or in admixture with the acid. This improvement is probably due to the formation of a complex.

A mixture of one mole of zinc chloride with 1.5 to 8 moles of an aliphatic monocarboxylic acid of not over three carbon atoms is most effective. Under preferred conditions when the alkyl group contains ten to fifteen carbon atoms, a mole ratio of 0.75 to 2.5 parts of zinc chloride per mole part of alkylphenyl hydrocarbon is used. This ratio may be reduced as the size of the alkyl group diminishes.

For one mole of alkylbenzene, alkyltoluene, or alkylxylene one to 2.5 moles of formaldehyde are used. The formaldehyde is supplied in an anhydrous form as from a revertible polymer. Anhydrous hydrogen chloride or bromide is passed into the reaction mixture. At 50° to 100° C. a halomethyl group is introduced without formation of undesirable by-products. In place of formaldehyde and hydrogen halide there may be used a halomethyl ether with good results.

Preparation of halomethylated alkylbenzenes is illustrated in the following examples.

Example 1

Hexylbenzene, prepared by the alkylation of benzene with propylene dimer, was mixed in an amount of 60 parts by weight with 25 parts of zinc chloride and 25 parts of acetic acid and heated to 50° C. Thereto over a period of an hour 40 parts of dichloromethyl ether was added with stirring. The reaction mixture was stirred and held at 55° C. to 60° C. for an hour. It was then cooled. Layers were allowed to form and the upper layer was taken. This was washed with water and sodium bicarbonate solution and then distilled under reduced pressure. The fraction collected at 120° C.–130° C./0.2 mm. corresponded in composition to hexylbenzyl chloride. It was chiefly the para isomer.

Example 2

Commercial 3-heptanol was dehydrated at 400° C. on an alumina catalyst and the heptene therefrom redistilled. A mixture was made with 125 parts by weight of this olefine, 198 parts of benzene, and 196 parts of sulfuric acid cooled to 5° C. The mixture was stirred for three hours, allowed to form layers, and separated. The organic layer was washed with water and a small amount of a soda ash solution, dried, and distilled under reduced pressure to yield 167 parts of heptylbenzene.

A mixture was made from 160 parts of this product, 90 parts of anhydrous zinc chloride, and 138 parts of glacial acetic acid. Thereto 106 parts of dichloromethyl ether were added with stirring while the temperature of the reaction mixture was kept at 60° C. The reaction mixture was stirred for five hours while this temperature was maintained. The mixture was cooled, allowed to form layers, and separated. The product layer was washed, dried, and fractionally distilled. Pure heptylbenzyl chloride was collected at 127°–132° C./0.2 mm.

Example 3

A mixture of 95 parts by weight of octylbenzene (chiefly 2-octylbenzene with some 3-octylbenzene), 30 parts of paraformaldehyde, 54 parts of anhydrous zinc chloride, and 120 parts of glacial acetic acid was stirred at 50° C. while hydrogen chloride was passed in for two hours at a fairly rapid rate. The reaction mixture was allowed to stratify and the upper layer was taken, washed with hot water, with a 10% sodium bicarbonate solution, and with hot water, dried over sodium sulfate and distilled. The forerun of 30 parts consisted of octylbenzene. There was then obtained at 119°–121° C./1 mm. 71 parts of octylbenzyl chloride.

Example 4

To a mixture of 46.5 parts of octylbenzene (chiefly 2-octylbenzene), 17 parts of anhydrous zinc chloride, and 40 parts of glacial acetic acid there was added dropwise 50 parts of bis-bromomethyl ether. The mixture was stirred and heated at 70° C. for four hours in all. Layers were allowed to form and were separated. The upper layer was washed with hot water, with 10% sodium bicarbonate solution, and with water. It was dried over sodium sulfate and distilled. At 155°–174° C./2 mm. there was obtained a fraction corresponding in composition to octylbenzyl bromide. It contained by analysis 28.8% of bromine. Theory for this product is 28.3%.

Example 5

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc. 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

To a mixture of 81 parts of this product, 47.5 parts of anhydrous zinc chloride, and 65 parts of glacial acetic acid there was added 46 parts of dichloromethyl ether while the mixture was stirred and held at 50°–60° C. for an hour. It was stirred at 70°–75° C. for four hours and allowed to form layers. The upper layer was separated, washed with water and sodium bicarbonate solution, and distilled. The fraction taken at 130°–150° C./0.3 mm. amounted to 43.8 parts and corresponded in composition to methyloctylbenzyl chloride.

Example 6

To a mixture of 70 parts of 2-ethylhexylbenzene (prepared according to the method of Sulzbacher and Bergmann, J. Org. Chem. 13, 303 (1948)), 50.3 parts of anhydrous zinc chloride, and 60 parts of glacial acetic acid there was added with stirring 42.5 parts of dichloromethyl ether over the course of an hour, while the reaction mixture was maintained at 60° C. Stirring was continued for another two hours with the temperature held at 60° C. Layers were then allowed to form and separated. The product layer was washed with sodium bicarbonate solution and distilled at 110°–125° C./0.07 mm. The distillate corresponded in composition to 2-ethylhexylbenzyl chloride.

Example 7

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

A mixture was made in the reaction vessel equipped with a stirrer of 32 parts of octyltoluene, 25 parts of anhydrous zinc chloride, and 60 parts of glacial acetic acid. With the temperature kept at 50° to 60° C. there was added thereto 20 parts of dichloromethyl ether. The temperature of the mixture was then raised to 90° C. for three hours. The reaction mixture was then separated into layers. The product layer was washed with water, with a 5% sodium bicarbonate solution, and again with water. Upon distillation a fraction was obtained at 133°–148° C./0.3 mm. which corresponded in composition to 2-methyl-5-octylbenzyl chloride.

Example 8

(a) Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

To a mixture of 80 parts of nonylbenzene, 40 parts of zinc chloride, and 59 parts of glacial acetic acid there was added at room temperature 45 parts of dichloromethyl ether. The mixture was stirred and heated at 70° C. for three hours. It was then allowed to stand and form layers. The upper layer was separated, washed with hot water, and with sodium bicarbonate solution, dried over sodium sulfate, and distilled. The fraction distilling at 141°–142° C./2 mm. was nonylbenzyl chloride.

(b) A portion of 3,5,5-trimethylhexyl alcohol was dehydrated as in Example 8a and 125 parts of the nonenes therefrom reacted with 200 parts of xylene and 125 parts of sulfuric acid at about 0° C. for four hours. The reaction mixture was allowed to stand. Layers formed and were separated. The organic layer was washed, dried, and distilled at low pressure. One hundred parts of the main fraction was mixed with 50 parts of zinc chloride and 70 parts of glacial acetic acid. Thereto was added 50 parts of dichloromethyl ether. The reaction mixture was gradually warmed to about 75° C. and stirred for four hours. The mixture was allowed to stand. It formed layers, which were separated. The organic layer was washed with water, sodium bicarbonate solution, and again with water, and dried over calcium sulfate. The product obtained gave an analysis which corresponded closely to that for nonyldimethylbenzyl chloride.

Example 9

To a mixture of 312 parts of benzene and 180 parts of sulfuric acid was added dropwise at 10°–20° C. 281 parts of decene, which was freshly prepared by dehydration of n-decanol on alumina. The mixture was stirred for five hours at room temperature. It was then allowed to form layers. The upper layer was separated, washed with concentrated sulfuric acid twice, and distilled. The fraction distilling at 115°–127° C./1.3 mm. was identified as sec.-decylbenzene.

A mixture of 54.5 parts of this sec.-decylbenzene, 27.3 parts of zinc chloride, and 60 parts of glacial acetic acid was stirred and heated to 70°–75° C. while 28.8 parts of dichloromethyl ether was slowly added. Stirring was continued at 70°–80° C. for five hours. Layers were allowed to form. The upper layer was separated, washed with water and sodium bicarbonate solution, dried, and distilled. At 155°–175° C./1.8 mm. there was obtained a fraction of 30 parts which corresponded in composition to sec.-decylbenzyl chloride.

Example 10

(a) Dodecyltoluene was prepared by mixing 344 parts of toluene and 294 parts of concentrated sulfuric acid and, while the mixture was stirred and the temperature maintained below 10° C., dodecylene was slowly added. The dodecylene used was a propylene tetramer. After 506 parts of dodecylene were added, the mixture was allowed to come to room temperature and stirring was continued for 24 hours. After separation from the acid layer, the product was washed with concentrated sulfuric acid and distilled in vacuo. Five hundred fifty-five parts of a colorless liquid boiling at 110°–160° C. at 1.2–2.2 mm. of mercury were obtained.

A mixture of 450 parts of dodecyltoluene with 105 parts of formaldehyde, 175 parts of anhydrous zinc chloride, and 250 parts of glacial acetic acid was stirred at 60°–70° C. while hydrogen chloride was passed in rapidly for two hours. Absorption was rapid and the reaction was accompanied by a rise of temperature. The lower catalyst layer was drained off and the product washed with water, 10% sodium carbonate solution, and again with water, then dried in vacuo on a steam-bath. Four hundred ninety parts of a yellow liquid having a chlorine content of 11.2% was obtained. The theoretical chlorine content of dodecylmethylbenzyl chloride is 11.5%. This material distills almost completely at 145°–185° C. at 0.5–1 mm. of mercury. It may, however, be used without further purification.

(b) Hydrogen chloride was passed into a mixture of 104 parts of dodecyltoluene, 24 parts of paraformaldehyde, 53.3 parts of zinc chloride and 59.2 parts of propionic acid for two hours at 70° C. The reaction product was worked up as in the preceding example. One hundred eighteen parts of methyldodecylbenzyl chloride was obtained.

Example 11

(a) In this example a propylene polymer, consisting of a mixture of the tetramer and the pentamer averaging about a 14-carbon olefine, was used. A boron trifluoride monohydrate catalyst was prepared by passing 33.5 parts of boron trifluoride gas into 9 parts of water below 25° C. To this was added 58 parts of toluene and then dropwise 98 parts of the above propylene polymer over a period of one hour with stirring. After the mixture was stirred for two more hours, the lower catalyst layer was separated. This layer has been re-used by fortification with more boron trifluoride. The hydrocarbon layer was washed with dilute sodium carbonate solution and distilled in vacuo. Eighty parts of a colorless liquid boiling at 124°–155° C. at 2 mm. of mercury were obtained. This was alkylated toluene in which the alkyl substituent averaged $C_{14}$.

(b) To a mixture of 79 parts of the alkylated toluene obtained above, 42 parts of anhydrous zinc chloride and 41 parts of glacial acetic acid, was added dropwise at 61°–65° C. 31.5 parts of dichloromethyl ether while the mixture was stirred. The mixture was then stirred and heated for two hours and allowed to separate. The upper product layer was washed with hot water and sodium bicarbonate solution. The product was heated in vacuo to remove water, and there was obtained 90 parts of liquid which corresponded in composition to the monochloromethylated mixture of dodecyl- and pentadecyltoluene averaging about fourteen carbon atoms.

The reaction of an alkylbenzyl halide and polyethylene glycol of a molecular weight of at least 550 is accomplished by heating these two compounds together in the presence of an alkali metal hydroxide. Stoichiometric relations require two moles of the halide and two moles of the hydroxide per mole of the glycol. Exact proportions are not, however, essential, as the presence of some alkylbenzyl polyether alcohol, if formed, is not troublesome in most applications as it too acts as a capillary active agent. An excess of alkylbenzyl halide is preferred. Excess of it can be removed from an aqueous solution of the reaction product by extraction with a water-immiscible solvent, such as heptane, toluene, or solvent naphtha. As much as a three-fold excess of such halide has been used without difficulties arising.

Temperature of reaction may be from 80° to 150° C. The reaction is usually complete in two to five hours. The reaction mixture can then be diluted with an organic solvent and cooled. The resulting solution is filtered to remove the salt formed in the reaction. Of course, where there is no objection to the presence of salt, the removal need not be practiced.

Example 12

A mixture was made from 12.5 parts by weight of potassium hydroxide and 55 parts of a polyethylene glycol of a molecular weight of 550. The mixture was heated to 80° C. and there was slowly added thereto with stirring 44 parts of hexylbenzyl chloride. After addition was complete, the reaction mixture was heated for four hours with the temperature carried to 140° C. The reaction mixture was cooled, toluene was added, the solution was filtered, and the solvent was evaporated. A straw-colored oil remained which had the composition $$C_6H_{13}C_6H_4CH_2(OCH_2CH_2)_nOCH_2C_6H_4C_6H_{13}$$

where $n$ has a value of 12. This oil is dispersible in water and gives a large depression in surface tension of its aqueous solutions. It has wetting, emulsifying, and dispersing action.

Example 13

A mixture of 60 parts of $H(OC_2H_4)_{23}OH$ and 6 parts of sodium hydroxide was reacted at 90° to 140° C. as in the previous example with 32 parts of hexylbenzyl chloride. The reaction mixture was cooled, diluted with toluene, and filtered. The solvent was evaporated to leave an oil which was amber in color and which had positive wetting properties. This oil was taken up in 50% aqueous isopropanol and this solution was extracted with heptane. The isopropanol and water were evaporated to leave a yellow oil. The yield was 92% of theory.

This product was subjected to wetting-out tests by the Draves method. A 0.5% solution gave a wetting-out time of 23 seconds, a 0.2% solution a time of 46 seconds, and a 0.1% solution a time of 75 seconds. The solutions formed considerable foam. They dispersed common solids such as carbon black. They showed fair soil removal from standard soiled fabric.

Example 14

To a mixture of 12.5 parts of potassium hydroxide and 70 parts of a polyethylene glycol having an apparent molecular weight of about 700 and, therefore, a chain having 15 to 16 ethylene groups, there was added 50 parts of heptylbenzyl chloride at 90°–110° C. The reaction mixture was heated for three hours and the temperature carried to 150° C. The reaction mixture was treated as above to remove salt and excess chloride. A 90% yield of the desired product $$C_7H_{15}C_6H_4CH_2(OCH_2CH_2)_nOCH_2C_6H_4C_7H_{15}$$

where $n$ has a value of 15 to 16 was obtained. A 0.5% solution of this product had a wetting-out time (Draves) of 18 seconds. It had useful dispersing properties.

Example 15

(a) To a mixture of 80 parts of a polyethylene glycol having a molecular weight of about 800 and 12.5 parts of potassium hydroxide there was added 60 parts of octylmethylbenzyl chloride. Reaction temperatures were 100° to 150° C. and the reaction was continued for four hours. Purification was accomplished as in previous examples with removal of salt by filtration and extraction with heptane. The product was a soft paste which was soluble in water. The solutions exhibited wetting, emulsifying, and dispersing properties.

(b) The above procedure was repeated with 80 parts of the same glycol, 12.5 parts of potassium hydroxide, and 71 parts of octylmethylbenzyl bromide. The product obtained was not distinguishable from that in the preparation above.

These products had the composition $$C_8H_{17}(CH_3)C_6H_3CH_2(OC_2H_4)_nOCH_2C_6H_3(CH_3)C_8H_{17}$$

where $n$ has a value of about 18.

Example 16

A mixture of 62.5 parts of a polyethylene glycol, having an apparent molecular weight of 1250 and, therefore, containing 28 ethylene groups, and 6 parts of sodium hydroxide was heated to 80° C. Thereto was slowly added 38 parts of nonylbenzyl chloride. The mixture was stirred and heated to 140° C. for three hours. The salt formed was removed by diluting with toluene and filtering. The product was further purified by dissolving in isopropanol and water (1:1) and extracting with heptane. There was obtained on evaporating the isopropanol-water solution 78 parts (93% yield) of a yellow oil, which set to a soft wax when cooled.

This product had very good detergent action as determined by wash tests with standard soiled fabric. Whiteness retention was good. Wetting-out times as determined by the Draves method were 10 seconds at 0.38%, 25 seconds at 0.11%, and 50 seconds at 0.066% concentrations. Wetting time by the canvas patch test was 25 seconds at 0.2% concentration. The solution gave considerable foam.

Example 17

The procedure of Example 16 was followed with use of 77 parts of nonylbenzyl chloride, 16.8 parts of potassium hydroxide, and 150 parts of a polyethylene glycol having about 34 ethylene groups. The product, $$C_9H_{19}C_6H_4CH_2(OC_2H_4)_{34}OCH_2C_6H_4C_9H_{19}$$

was a waxy solid, which was obtained in a 94% yield. Wetting-out times of solutions were determined by the Draves method as follows: 26 seconds at 0.5%, 41 seconds at 0.2%, and 59 seconds at 0.1%. The product was a good emulsifying agent, an excellent dispersing agent, and a good detergent.

*Example 18*

The procedure of Examples 16 and 17 was followed with use of 75 parts of nonylbenzyl chloride, 16 parts of potassium hydroxide, and 180 parts of a polyethylene glycol having an apparent molecular weight approaching 1800 and containing about 40 glycol units. The product, $$C_9H_{19}C_6H_4CH_2(OC_2H_4)_{40}OCH_2C_6H_4C_9H_{19}$$

was a wax, obtained in 87% yields. It had properties somewhat the same as those of the previous product, although it was slightly slower in wetting-out and more effective in dispersing.

*Example 19*

(a) There were reacted by the above procedures 44 parts of dodecylbenzyl chloride, 75 parts of polyethylene glycol having about 34 glycol units, and 8.4 parts of potassium hydroxide. A yield of 82% of $$C_{12}H_{25}C_6H_4CH_2(OC_2H_4)_{34}OCH_2C_6H_4C_{12}H_{25}$$

was obtained. The rate of wetting-out with this compound is slow, yet it is definitely capillary active, being useful as a dispersing and emulsifying agent.

(b) The same procedure was followed with 44 parts of dodecylbenzyl chloride, 51 parts of a polyglycol having about 23 ethylene groups per molecule, and 8.4 parts of potassium hydroxide. The product was a waxy solid similar in properties to the compound of Example 19a.

(c) The same procedure was followed with 46 parts of dodecylmethylbenzyl chloride, 51 parts of the polyglycol having about 23 ethylene groups per molecule, and 8.4 parts of potassium hydroxide. The product was likewise a waxy solid which closely resembled the product of Example 19b.

*Example 20*

A mixture of 110 parts of a polyethylene glycol having an apparent molecular weight of 2200 and therefore containing an average of 50 ethylene groups and 4 parts of sodium hydroxide was heated to 100° C. There was slowly added 33.7 parts of the monochloromethylation product of mixed dodecyl and pentadecyl toluenes averaging about one-third dodecyl- and two-thirds pentadecyl-toluene, obtained in Example 10a. The mixture was heated and stirred for two hours and the product isolated by adding toluene, filtering, and removing the toluene by heating in vacuo. The product was obtained as a soft paste which had excellent emulsifying and dispersing properties.

The compounds of this invention are prepared by reaction of an alkylbenzyl halide and a polyethylene glycol having 12 to 50 or more ethylene units per molecule in the presence of an alkali metal hydroxide. The products are surface-active agents of the non-ionic type, having good wetting and dispersing actions. They are particularly characterized by the absence of a reactive functional group, such as the terminal hydroxyl group of heretofore known non-ionic agents. Because of this fact and probably also of a different type of ether linkage near the phenyl groups, the compounds of this invention have excellent stability. The stability is particularly noticeable in connection with strongly alkaline builders and cleaners. Whereas the previously known non-ionic agents discolor in contact with strongly basic compounds, such as sodium silicates and caustic soda, there is no evident decomposition in the case of these compounds.

They may thus be used for the preparation of strongly alkaline compositions. From about 0.5 to 10 parts of one of the compounds is mixed with 100 parts of powdered or flake caustic or a sodium silicate to yield a composition suitable for cleaning, the compound augmenting the alkaline agent. These compounds may also be used in strongly alkaline liquors for kier boiling, digesting pulp, mercerizing, and the like.

I claim:

1. A process for preparing a surface-active compound of the formula $$R^1R^2R^3ArCH_2O(CH_2CH_2O)_nCH_2ArR^1R^2R^3$$

which comprises reacting at 80° to 150° C. about one mole of a polyglycol of the formula $$HO(CH_2CH_2O)_nH$$

with about two moles of a halide of the formula $$R^1R^2R^3ArCH_2X$$

in the presence of about two moles of an alkali metal hydroxide, $R^1$ being an alkyl group of six to fifteen carbon atoms, $R^2$ and $R^3$ being members of the class consisting of hydrogen and the methyl group, Ar being a phenyl group, $n$ being a number from 12 to 50, and X being a halogen of atomic weight 35 to 80.

2. A process for preparing a surface-active compound of the formula $$R^1C_6H_4CH_2O(CH_2CH_2O)_nCH_2C_6H_4R^1$$

which comprises reacting at 80° to 150° C. about one mole of a polyglycol of the formula $$HO(CH_2CH_2O)_nH$$

with about two moles of a halide of the formula $$R^1C_6H_4CH_2Cl$$

in the presence of about two moles of an alkali metal hydroxide, $R^1$ being an alkyl group of six to fifteen carbon atoms and $n$ being a number from 12 to 50.

3. The process of claim 2 in which $R^1$ is a nonyl group.

4. A process for preparing a surface-active compound of the formula $$R^1(CH_3)C_6H_3CH_2O(CH_2CH_2O)_nCH_2C_6H_3(CH_3)R^1$$

which comprises reacting at 80° to 150° C. about one mole of a polyglycol of the formula $$HO(CH_2CH_2O)_nH$$

with about two moles of a halide of the formula $$R^1(CH_3)C_6H_3CH_2Cl$$

in the presence of about two moles of an alkali metal hydroxide, $R^1$ being an alkyl group of six to fifteen carbon atoms and $n$ being a number from 12 to 50.

5. The process of claim 4 wherein $R^1$ is a nonyl group.

6. A capillary active compound of the formula $$R^1R^2R^3ArCH_2O(CH_2CH_2O)_nCH_2ArR^1R^2R^3$$

wherein $R^1$ is an alkyl group of six to fifteen carbon atoms, $R^2$ and $R^3$ are members of the class consisting of hydrogen and the methyl group, Ar is a phenyl group, and $n$ is a number from 12 to 50.

7. A capillary active compound of the formula $$R^1C_6H_4CH_2O(CH_2CH_2O)_nCH_2C_6H_4R^1$$

wherein $R^1$ is an alkyl group of six to fifteen carbon atoms and $n$ is a number from 12 to 50.

8. A capillary active compound of the formula $$R^1(CH_3)C_6H_3CH_2O(CH_2CH_2O)_nCH_2C_6H_3(CH_3)R^1$$

wherein $R^1$ is an alkyl group of six to fifteen carbon atoms and $n$ is a number from 12 to 50.

9. A capillary active compound of the formula $$C_9H_{19}C_6H_4CH_2O(CH_2CH_2O)_nCH_2C_6H_4C_9H_{19}$$

wherein $n$ is a number from 12 to 50.

10. A capillary active compound of the formula $$C_9H_{19}(CH_3)C_6H_3CH_2O(CH_2CH_2O)_nCH_2C_6H_3(CH_3)C_9H_{19}$$

wherein $n$ is a number from 12 to 50.

11. A composition of matter comprising 0.5 to 10 parts of a compound of the formula $$R^1R^2R^3ArCH_2O(CH_2CH_2O)_nCH_2ArR^1R^2R^3$$

and 100 parts of a strongly alkaline cleaner, $R^1$ being an alkyl group of six to fifteen carbon atoms, $R^2$ and $R^3$ being members of the class consisting of hydrogen and the methyl group, Ar being a phenyl group, and $n$ being a number from 12 to 50.

PETER L. DE BENNEVILLE.

REFERENCES CITED

The following references are of record in the file of this patent:

UNITED STATES PATENTS

| Number | Name | Date |
|---|---|---|
| 2,209,911 | Bruson et al. | July 30, 1940 |
| 2,213,477 | Steindorff et al. | Sept. 3, 1940 |
| 2,459,526 | Heckenbleikner | Jan. 18, 1949 |

FOREIGN PATENTS

| Number | Country | Date |
|---|---|---|
| 202,352 | Germany | Oct. 3, 1908 |
| 422,948 | Germany | Dec. 16, 1945 |
| 655,871 | France | Dec. 22, 1928 |